(12) United States Patent
Tomohiro (10) Patent No.: US 7,383,445 B2
(45) Date of Patent: Jun. 3, 2008

(54) SEMICONDUCTOR STORAGE DEVICE

(75) Inventor: Ichiro Tomohiro, Shijyonawate (JP)

(73) Assignee: Sharp Kabushiki Kaisha, Osaka (JP)

( * ) Notice: Subject to any disclaimer, the term of this patent is extended or adjusted under 35 U.S.C. 154(b) by 537 days.

(21) Appl. No.: 09/894,203

(22) Filed: Jun. 28, 2001

(65) Prior Publication Data

US 2002/0002654 A1 Jan. 3, 2002

(30) Foreign Application Priority Data

Jul. 3, 2000 (JP) .............................. 2000-201650

(51) Int. Cl.
*G06F 11/30* (2006.01)
*G06F 12/14* (2006.01)
*H04L 9/32* (2006.01)

(52) U.S. Cl. .......................... 713/193; 726/27; 711/103

(58) Field of Classification Search ................ 713/201, 713/193; 711/103; 726/27
See application file for complete search history.

(56) References Cited

U.S. PATENT DOCUMENTS

| | | | | |
|---|---|---|---|---|
| 4,864,542 A | * | 9/1989 | Oshima et al. | ........ 365/189.01 |
| 5,175,840 A | * | 12/1992 | Sawase et al. | .............. 711/103 |
| 5,335,206 A | * | 8/1994 | Kawamoto | ............... 365/233.5 |
| 5,374,847 A | * | 12/1994 | Araki et al. | ................. 257/639 |
| 5,539,689 A | * | 7/1996 | Aoki | ..................... 365/185.21 |
| 5,708,715 A | * | 1/1998 | Vicard | ........................ 713/191 |
| 5,838,613 A | * | 11/1998 | Takizawa | ............... 365/185.04 |
| 5,966,388 A | * | 10/1999 | Wright et al. | ................ 714/719 |
| 5,974,513 A | * | 10/1999 | Matsuo et al. | .............. 711/164 |
| 6,163,484 A | * | 12/2000 | Uekubo | .................... 365/185.2 |
| 6,222,779 B1 | * | 4/2001 | Saito et al. | ............ 365/189.09 |
| 6,229,731 B1 | * | 5/2001 | Kasai et al. | ........... 365/185.04 |
| 6,260,172 B1 | * | 7/2001 | Hazama | ...................... 714/773 |
| 6,415,007 B1 | * | 7/2002 | Kawasumi | .................. 375/374 |
| 6,543,017 B1 | * | 4/2003 | Arai | .......................... 714/719 |

FOREIGN PATENT DOCUMENTS

| | | |
|---|---|---|
| JP | 03-296842 | 12/1991 |
| JP | 9034797 | 11/1996 |
| JP | 10-134586 | 5/1998 |
| JP | 2000-112824 | 4/2000 |

* cited by examiner

*Primary Examiner*—Nasser Moazzami
*Assistant Examiner*—David Garcia Cervetti
(74) *Attorney, Agent, or Firm*—Morrison & Foerster LLP (57) ABSTRACT

A semiconductor storage device having a security function for imposing limitation on data rewriting includes: at least one non-volatile memory cell array block which is capable of receiving concurrent electrical erasure; at least one memory region, each one of said at least one memory region being provided in the at least one memory cell array block, for storing a security release key; at least one non-volatile storage means for storing a security registration lock corresponding to each of the at least one memory cell array block; a determination circuit for generating a security release signal using the security release key and the security registration lock; and a memory cell array data output switching circuit for outputting security released data externally.

11 Claims, 3 Drawing Sheets

SEMICONDUCTOR STORAGE DEVICE

CROSS-REFERENCE TO RELATED APPLICATIONS

This application claims priority to Japanese Patent Application Number 2000-201650 filed Jul. 3, 2000, the content of which is incorporated herein by reference in its entirety.

BACKGROUND OF THE INVENTION

1. Field of the Invention

The present invention relates to a semiconductor storage device having non-volatile memory cell array blocks, e.g., as used in semiconductor integrated circuits. In particular, the present invention relates to a semiconductor storage device having a security function for preventing unauthorized tampering with any content stored in a memory.

2. Description of the Related Art

Electrically erasable non-volatile semiconductor storage devices, such as flash memories, are capable of on-system data rewriting. That is, the data and/or codes stored in such a semiconductor storage device can still be updated even after the semiconductor storage device has been incorporated into a system. Therefore, electrically erasable non-volatile semiconductor storage devices, such as flash memories, are widely used as means for storing programs for driving a microcomputer-based system or the like in accordance with a desired procedure. In such cases, information to be utilized for user authentication, checking programs, and the like are also stored in the same storage device. Therefore, an ability to prevent unauthorized rewriting of data (or "tampering") while also permitting easy updating of stored content is desired.

For example, as disclosed in Japanese Laid-Open Publication No. 9-34797, in actual implementations or proposed structures of tamper prevention circuits, a function limitation release key code (i.e., a key code which disengages a function limitation) is externally input to enable authentication of any access made by an authorized user.

Figure 3:
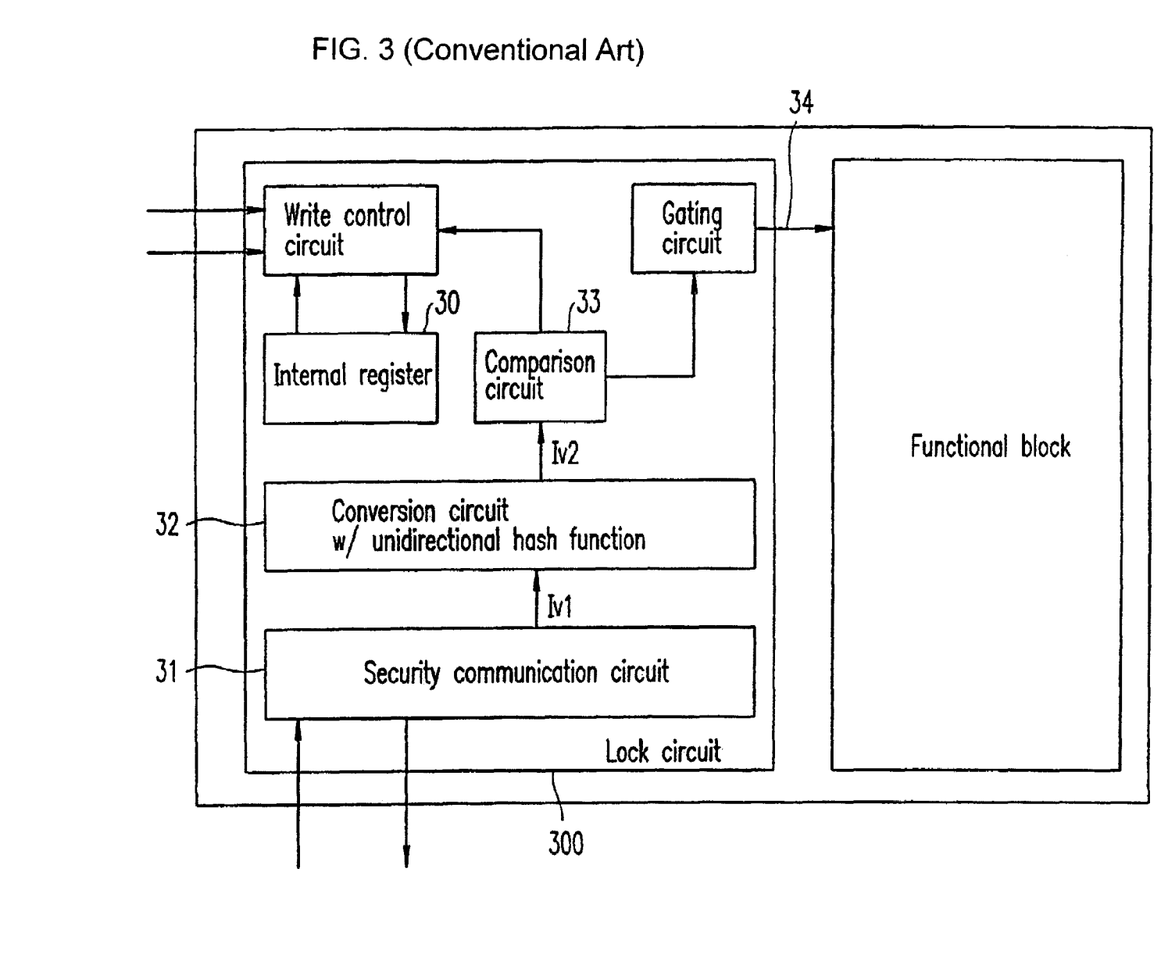
FIG. 3 is a block diagram illustrating the structure of a semiconductor memory incorporating a conventional data tamper prevention circuit 300.

FIG. 3 illustrates a semiconductor memory incorporating a conventional data tamper prevention circuit. This conventional circuit (lock circuit) 300 includes: an internal register 30 for storing a key code which has been subjected to a unidirectional hash conversion; a decoder circuit (security communication circuit) 31 for decoding an input code; a conversion circuit 32 including a unidirectional hash function; a function limitation release determination circuit (comparison circuit) 33; a write control circuit; and a gating circuit.

In accordance with the lock circuit 300, in order to provide data protection in the case where a reference value (key code) which is previously stored in the internal register 30 is directly read by an unauthorized party, the reference value is converted by the unidirectional hash conversion circuit 32 so as to be stored in a converted form, rather than in a plaintext form. In order to also protect a function limitation release key code which is externally input to the device, the externally-input function limitation release key is encrypted. The function limitation release key is decoded by the security communication circuit 31 (to become a key code Iv1), and thereafter converted by the unidirectional hash conversion circuit 32 (to become a key code Iv2). This converted value is compared against the reference value stored in the internal register 30 by the comparison circuit 33. If the two values match, a function limitation release signal 34 is issued to release the function limitation. In order to survive "repetitive attacks" (i.e., a fraudulent technique of trying every possible key input pattern until obtaining a match), the security communication circuit 31 is constructed based on a Diffie-Hellman Key Exchange algorithm or the like, so that a different valid key is generated each time.

However, the aforementioned conventional techniques have the following problems.

First, in order to release the function limitation, it is necessary to externally input a function limitation release key. Accordingly, the above-described system requires an external key storage device for storing the function limitation release key. However, since the function limitation release key is retained external to the device, the key must pass through an interfacing section every time access is requested, independent of what sort of encryption technique may be employed in the communication path between the devices, i.e., between the device shown in FIG. 3 and any other device within the system (e.g., the key storage device). This may run the risk of the function limitation release key being intercepted during communication, or being directly read from the external key storage device.

Moreover, complicated circuitry is required for encrypting signals exchanged between devices, and particularly complicated encryption is required. Hence, complicated decoding circuitry within the device is required to provide protection against repetitive attacks.

Furthermore, in order to effectuate a good tamper prevention function, merely replacing a given semiconductor storage device with a semiconductor storage device having a tamper prevention function does not suffice. In addition, the entire system must be redesigned to enable a good tamper prevention function.

SUMMARY OF THE INVENTION

According to the present invention, there is provided a semiconductor storage device having a security function for imposing limitation on data rewriting, the semiconductor storage device comprising: at least one non-volatile memory cell array block which is capable of receiving concurrent electrical erasure; at least one memory region, each one of said at least one memory region being provided in the at least one memory cell array block, for storing a security release key; at least one non-volatile storage means for storing a security registration lock corresponding to each of the at least one memory cell array block; a determination circuit for comparing a value which is generated based on the security release key against a value which is generated based on the security registration lock to determine whether or not to grant release of the security function; and a memory cell array data output switching circuit for, when an output signal from the determination circuit indicates a matching result of comparison between the value which is generated based on the security release key and the value which is generated based on the security registration lock, permitting data which is read from a corresponding one of the at least one memory cell array block to be externally output.

When data is rewritten, a relevant memory cell array block is erased, which also results in the erasure of a security release key stored in a memory region of that block. As a result, when new data is to be written after erasure, in order to release the limitation imposed on reading from the system, the security release key needs to be written again into the memory region corresponding to a security registration lock stored in a non-volatile storage means (e.g., a non-volatile register) associated with each block. Since the proper security release key is only known to an authorized user(s), once an unauthorized party rewrites the stored content in the memory, the entire system becomes non-functional. Thus, unauthorized data tampering (unauthorized rewrite) can be prevented.

In general, electrically erasable non-volatile semiconductor storage devices, such as flash memories, can only withstand a certain number of write/erase operations while maintaining guaranteed data quality. Therefore, as a non-volatile semiconductor storage device according to the present invention receives repetitive attacks (trial-and-error attacks) on the security release keys from an unauthorized party, the non-volatile semiconductor storage device will undergo degradation which is not desirable even to the unauthorized party. Furthermore, in the case of a flash memory, where block erasure requires a longer time than data read or data write, repetitive attacks (trial-and-error attacks) on the security release keys would be too time-consuming to be practical.

At the time of authentication, a determination circuit is used to compare a value which is generated based on a security release key and a value which is generated based on a security registration lock, and the security function is released only if the result of comparison indicates a match. Thus, the security release keys are not exchanged with any external devices. As a result, there is no risk of the security release keys being intercepted as in conventional techniques, thus making the security function difficult to decipher.

No complicated encryption circuitry or decoding circuitry for encrypting or decoding inter-device communication is required unlike conventional techniques. Thus, the structure of the semiconductor storage device according to the present invention can be simplified. Since there is no need to externally retain a security release key in the present invention, there is no risk of the security release keys being directly read out from an external key storage device, which is a risk in conventional techniques. Also, there is no need to provide any special means in the system to realize tamper prevention.

The semiconductor storage device according to the present invention can be used as a device without a security function unless rewriting is performed. Yet, once an unauthorized rewrite is performed, the security function is activated to render the system non-functional. As a result, it is possible to provide a non-volatile semiconductor storage device which is compatible with a conventional system such that the user or the system is not allowed to be conscious of the presence of the security function (password).

The setting of a security release key requires user input. Thus, an authorized user must know a password (security release key). Since an authorized user who knows the proper security release key can always write the proper security release key to the memory region after data rewriting, authorized rewriting is enabled.

In one embodiment of the invention, the semiconductor storage device further comprises at least one register for retaining an output signal output from the determination circuit; and when an output signal output from the at least one register indicates that release of the security function is to be granted, the memory cell array data output switching circuit permits data which is read from a corresponding one of the at least one memory cell array block to be externally output.

By retaining the comparison result for each block in a volatile register, it is possible to realize access limitation based on the values retained in such registers once comparison is made. Thus, the decrease, if any, in the access speed of the non-volatile semiconductor storage device of the present invention can be reduced, so that the user can remain unconscious of the presence of the security function. The reason for using the volatile registers is as follows. If the authentication of the security registration lock and the security release key is performed per access, the access speed decreases. In contrast, the use of a (volatile) register makes unnecessary any additional authentication per access, once authentication is performed at the time of turning the device ON. Thus, no decrease in the access speed will result. On the other hand, if a non-volatile register was used, successful authentication could occur based on the value stored in the non-volatile register once authentication was made, because there would be no further need to perform an actual authentication based on a security registration lock and a security release key. As a result, if it is somehow possible to directly rewrite the content in a non-volatile register in an unauthorized manner, or if it is possible to ensure by using unauthorized means that a value which is once set will never be erased, the security function will not subsequently work and is therefore so much weaker.

As depicted in an embodiment of the present invention described later, a value which represents a matching comparison result may be retained in the non-volatile register associated with any of the blocks for which the security function is not required.

In another embodiment of the invention, the semiconductor storage device further comprises instruction interpretation means for interpreting an externally-input setting instruction to write at least one of the security release key and the security registration lock into the at least one memory region or the at least one non-volatile storage means, respectively.

When a user inputs a setting instruction along with a security release key or a security registration lock, the instruction interpretation means interprets the setting instruction, and a security release key or a security registration lock is written in a corresponding memory region or non-volatile storage means in accordance with an output of the instruction interpretation means. This feature of the present invention makes it possible to set any value of a security registration lock in each non-volatile semiconductor storage device even after the non-volatile semiconductor storage device is manufactured and shipped. Thus, it becomes possible to provide a higher level of security based on a reduced number of users knowing the proper values of the security registration locks.

By changing the security registration lock value from system to system, a higher level of security can be provided. Moreover, even if the security registration lock value is somehow leaked to an unauthorized party, the security registration lock value may be utilized to identify the information on a given system incorporating the non-volatile semiconductor storage device according to the present invention (e.g., when and in which plant the system was manufactured). Such information can be utilized to clarify the manner in which the security registration lock was leaked to the unauthorized party.

The instruction interpretation means may interpret only one of a security release key setting instruction or a security registration lock setting instruction. In the case where a security release key setting instruction is not implemented, security release key data may be conveniently contained in a usual data input command sequence. For example, it may be possible to employ a command system of an n+4 cycle as follows:

1): a program command
2): the number of program data (n)

3) to 3+n): program data strings n+4): security release key data

However, note that the omission of a security release key setting instruction as a separate instruction may result in the following tradeoffs: (1) loss of compatibility with conventional devices; (2) increased likelihood of the presence of the security function being known; and (3) inconvenience of having to input security release key data every time when a command for rewriting part of a block (e.g., in a word-by-word or byte-by-byte manner) is input. On the other hand, by implementing a security release key setting instruction as a separate command, it becomes possible to provide a device having a security function while maintaining compatibility with conventional devices. Thus, it is unnecessary to make public the presence of the security function to users, including unauthorized tamperers, of a system incorporating the semiconductor storage device according to the present invention. Furthermore, it becomes relatively easy to impart an additional security function based on a wait operation (described later), for example.

In still another embodiment of the invention, the determination circuit compares the value which is generated based on the security release key against the value which is generated based on the security registration lock for each of the at least one memory cell array block, and results of comparison are collaterally written in the at least one register.

Since a release key and a security registration lock are compared for at least one memory cell block and the comparison results are collaterally written to the registers, it is possible to prevent a decrease in the access speed of the non-volatile semiconductor storage device. The authentication may be activated in response to an authentication instruction from a user. Alternatively, authentication may be automatically performed at the time of turning the device ON or restoring the device after a reset operation.

In still another embodiment of the invention, the semiconductor storage device further comprises a unidirectional conversion circuit or an encryption circuit, wherein results of converting the security release key and the security registration lock by means of the unidirectional conversion circuit or the encryption circuit are written to the at least one memory region and the at least one non-volatile storage means, respectively.

Since the security release keys and the security registration locks are stored in an encrypted form rather than in a plaintext form, it is difficult to tamper with the stored information even if the data security release keys and/or the security registration locks are somehow read to an unauthorized party. In particular, it is preferable to perform conversion using a unidirectional function which does not permit easy reverse conversion (e.g., a unidirectional hash function) circuit. However, the conversion may be implemented by simple encryption circuitry. Note that any circuitry used must be arranged so that a conversion result of a security release key becomes identical to a conversion result of the security registration lock.

In still another embodiment of the invention, the semiconductor storage device lacks means for reading the security release key and the security registration lock.

Since means for externally reading the security release keys and security registration locks is omitted from the device, the release keys and registration locks together serve as write-only registers. Thus, it is possible to prevent security release keys and/or the security registration locks from being directly read by an unauthorized party who may attempt to tamper with the stored data.

In still another embodiment of the invention, the at least one non-volatile storage means is a one-time programmable ROM which prohibits rewriting and erasure; and rewriting and erasure are prohibited after the security registration lock is written.

In still another embodiment of the invention, the at least one non-volatile storage means is a one-time programmable ROM which prohibits rewriting and erasure; and the semiconductor storage device has a non-volatile lock function for locking the semiconductor storage device to prohibit rewriting and erasure after writing of the security registration lock has been performed.

By setting security registration locks in a one-time programmable ROM, it becomes possible to prohibit rewrite operations once the security registration lock is set. Alternatively, non-volatile storage means which is capable of being rewritten may be provided, and a lock function such as a non-volatile lock flag may be employed to lock the device after the security registration lock has been written, thereby prohibiting rewrite operations. As a result, it becomes possible to prevent the security registration locks themselves from being rewritten in an unauthorized manner.

In still another embodiment of the invention, the semiconductor storage device further comprises a flag indicating that the security release key has been set, wherein the flag is set automatically or manually after the security release key is written, thereby prohibiting additional writing to the corresponding one of the at least one memory cell array block.

By setting a flag indicating that a security release key has been set, additional writing to any block for which a security release key has been set (written) can be prohibited. If the security release key turns out to be an unauthorized key, then dummy data will be output. Accordingly, an unauthorized party who conducts repetitive attacks on the security release keys is required to perform data write to the block before attempting to input a security release key in order to confirm if the security function has actually been released. Thus, a significantly longer time is required for each round of trial-and-error attacks, thereby making the deciphering of the security release keys so much more difficult.

In still another embodiment of the invention, a wait operation is performed while writing the security release key to the at least one memory region.

Since a wait operation is performed during the setting of the security release keys in the present invention, a significantly longer time is required than in usual write operations to the memory cell array blocks. As a result, an unauthorized party who conducts repetitive attacks on the security release keys must spend a significantly longer time for each round of trial-and-error attacks, whereby the deciphering of the security release keys is made so much more difficult.

Thus, the invention described herein makes possible the advantage of providing a semiconductor storage device which: 1) i s capable of protecting any data stored in a memory cell array block from unauthorized tampering; 2) permits authorized rewrite of the data; 3) is compatible with conventional non-volatile semiconductor storage devices; and 4) is protected against repetitive attacks by unauthorized parties trying to attain authentication, and thus the present invention provides a semiconductor storage device employing a security release key which is difficult to decipher and which does not need to be externally retained in any devices outside the non-volatile semiconductor storage device.

This and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples, with reference to the accompanying figures.

Figure 1:
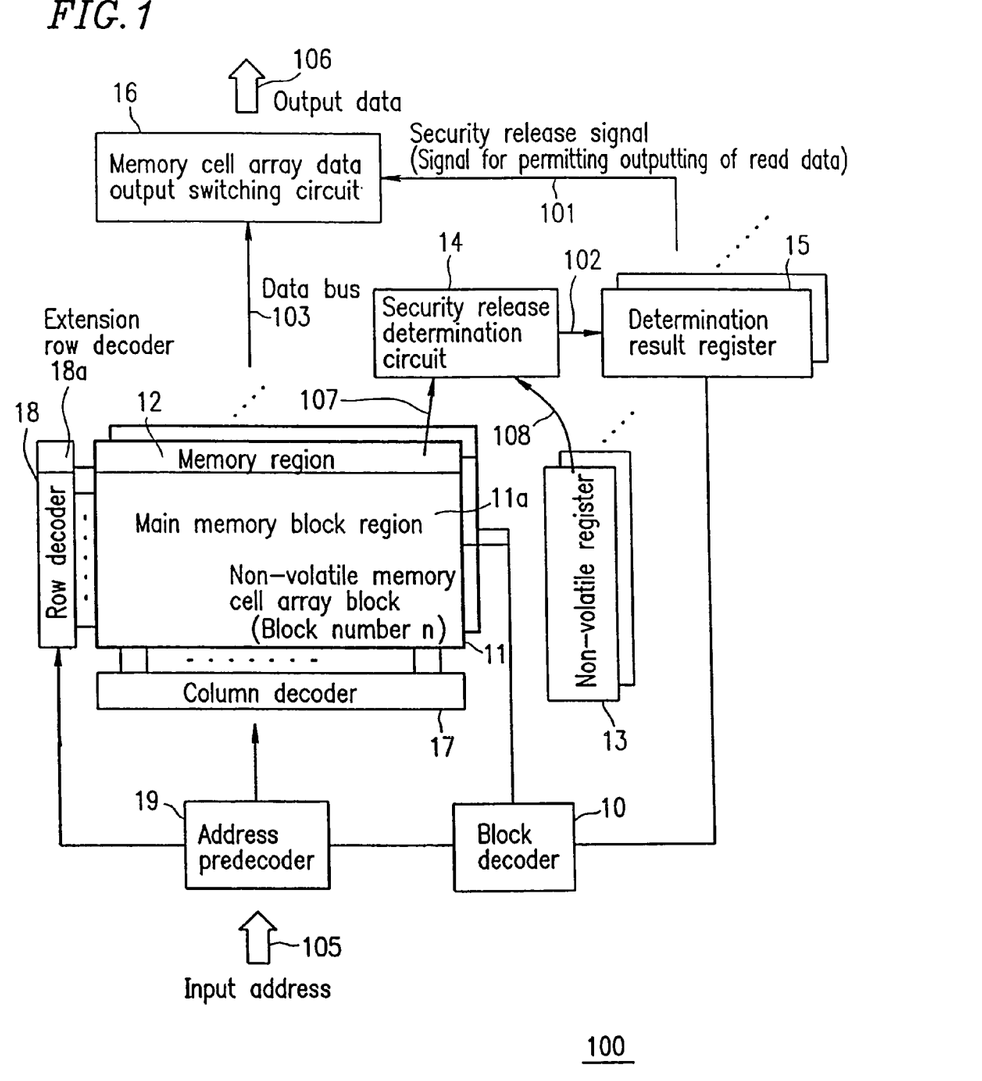
FIG. 1 is a block diagram illustrating a structure of a non-volatile semiconductor storage device 100 according to an example of the present invention.

FIG. 1 is a block diagram illustrating a structure of a non-volatile semiconductor storage device 100 according to an example of the present invention.

The non-volatile semiconductor storage device 100 is a flash EEPROM circuit which includes: an address predecoder 19; a column decoder 17; a row decoder 18; a block decoder 10; at least one non-volatile memory cell array block 11 capable of concurrent electrical erasure; non-volatile registers 13 which respectively store security registration locks respectively corresponding to associated memory cell array blocks (n) (where n is an integer); a security release determination circuit 14; determination result registers 15 respectively corresponding to the associated blocks (n); and a memory cell array data output switching circuit 16.

Each memory cell array block 11 includes a main memory block region 11a which can be used by a user to store data, and a memory region 12 for storing a security release key independently from the address space of the main memory. For example, the memory region 12 can be realized by adding extra (extension) rows and an extension row decoder 18a to the memory cell array block 11.

The security release determination circuit 14 compares the value of a security registration lock stored in the non-volatile register 13 against the value of a security release key stored in the memory region 12 of the memory cell array block 11, and determines whether or not to grant release of the security function. For example, the security release determination circuit 14 may be implemented as a matching circuit which simply determines whether or not the security registration lock matches the security release key. Alternatively, the security release determination circuit 14 may be a comparison circuit which compares a value obtained by subjecting one of the key or the lock to a predetermined mathematical operation (which may be a simple operation, such as XOR, or a more complicated operation, such as unidirectional hash conversion) against the other.

Each determination result register 15 is a register which stores an output result of the security release determination circuit 14 (i.e., the result of comparison) with respect to an associated memory cell array block 11. Note that each determination result register 15 may be a volatile register.

The memory cell array data output switching circuit 16 is a circuit which permits data read from a particular block to be externally output if an output signal from the security release determination circuit 14 indicates that the result of comparison between a security release key and a security registration lock represents a match. The memory cell array data output switching circuit 16 may be implemented as an output multiplexer, for example.

The non-volatile semiconductor storage device 100 according to the present example may operate in the following exemplary manner when performing a data read operation from a desired one of the memory cell array blocks 11.

In response to an externally-input address 105, the memory cells in the desired memory cell array block 11 are selected, so that the stored data are broken down into blocks, columns, rows, which are respectively decoded by the block decoder 10, the column decoder 17, and the row decoder 18. Thus, data in the desired memory cell array block 11 is read.

The data which is read from the memory cell array block 11 is input to the memory cell array data output switching circuit 16 via a data bus 103. The memory cell array data output switching circuit 16 outputs the data 103 read from the memory cell array block 11 as output data 106 only if a security release signal 101 is asserted. On the other hand, if the security release signal 101 is not asserted, then dummy data (e.g., a value representing all of the memory cells having been erased) is output as the output data 106. Accordingly, any system incorporating the non-volatile semiconductor storage device according to the present invention will not operate unless the security release signal 101 is asserted.

The security release signal 101 is generated based on an output signal (security release signal) 102 output from the security release determination circuit 14. Read data representing a security release key stored in the memory region 12 of the memory cell array block including a selected memory cell is input to the security release determination circuit 14 via a data bus 107. Read data representing a security registration lock corresponding to that memory cell array block (as stored in one of the non-volatile registers 13) is input to the security release determination circuit 14 via a data bus 108. Then, the security release determination circuit 14 outputs a signal indicating that the read data representing the security release key and the read data representing the security registration lock match, whereby the security release signal 101 is asserted.

According to the present example, the value of the security release signal 101 is stored in the volatile register 15 associated with each block in order to improve access speed. Alternatively, the output 102 from the security release determination circuit 14 may be directly input as the security release signal 101 to the memory cell array data output switching circuit 16.

When the address 105 is externally input, the block decoder 10 decodes a corresponding block address, whereby the corresponding register 15 is selected. As a result, the value retained in that register 15 is output as the security release signal 101. Thus, since it is not necessary to read a security release key and a security registration lock and determine whether or not to release the security function in response to every access made to the memory, it is possible to control the output of read data without allowing the access speed to deteriorate.

In one embodiment of the present invention, the volatile registers 15 may be arranged so that a security authentication instruction will be automatically issued within the device, in response to triggering events, such as the beginning of supply of power to the device (i.e., when the device is turned ON) or a reset signal (i.e., when the device is reset).

As a result, it is ensured that results of comparisons between security release keys and security registration locks ("security release determination results") are stored in the volatile registers 15 prior to actual use, so that the user does not need to be conscious of the security authentication instruction.

Alternatively, the security authentication instruction may be reserved as a command to be issued by a user. In that case, the command may be an independent command to be issued by a user, or the security authentication instruction may be enabled in response to another command (e.g., an array read mode transition command).

In response to the security authentication instruction, security release keys and security registration locks are sequentially read with respect to some or all of the blocks, compared by the security release determination circuit 14, and the results are sequentially written to the volatile registers 15 associated with those blocks. This process is performed until all of the blocks have undergone this process. The circuitry for accomplishing this operation may be realized by a dedicated state machine, but may also be composed of any state machine or microprocessor which is already present in the semiconductor storage device for handling a program or an erase algorithm.

The registers 15 associated with any blocks for which the security function is not required may be composed of non-volatile registers which fixedly retain a value which is entitled to the release of the security function. As a result, access will be permitted to any blocks that have a fixed value which is entitled to the release of the security function, irrespective of the values of the security release keys. In this case, it is unnecessary to set security release keys after a rewrite operation (described in more detail below). Thus, in the case of applications, such as BIOS or firmware, which function as ROMs during system operation and require no rewriting, a user of a system incorporating the non-volatile semiconductor storage devices according to the present invention will not be conscious of the presence of the security function.

Instead of previously performing security release determinations and collaterally writing the determination results in the respective registers 15, a security release determination may be separately performed for each block. For example, the comparison of a security release key and a security registration lock may be performed when each block is first accessed, and the second or any subsequent access may be serviced based on the result which was registered in the associated volatile register 15 during the first access.

In a system incorporating the non-volatile semiconductor storage device according to the present invention, an authorized user may rewrite data stored in a desired block in accordance with the following procedure.

First, the entire memory cell array block ("target block") 11 in which data is to be rewritten is concurrently erased. Note that the security release key stored in the memory region 12 of the target block is also erased at this time.

Next, new data is written in the main memory block region 11a, and finally an authorized security release key (e.g., an instruction for setting a security release key, hereinafter referred to as a "security release key setting instruction") is issued and written in the memory region 12. Instead of issuing a security release key setting instruction, security release key data may be contained in a usual data input command sequence.

As will be appreciated, a block to which rewrite has been performed will not accept access unless an authorized security release key is set. In other words, if an unauthorized party attempts an unauthorized tampering with programs or data stored in the semiconductor storage device according to the present invention, the falsified data or program cannot be read because the security release key is not known to unauthorized parties. As a result, the system storing any data or program which has been tampered with will not function properly.

The circuitry ("instruction interpretation circuit") for interpreting such a security release key setting instruction, and the circuitry for executing the security release key setting instruction, may be realized by utilizing any state machine or microprocessor which is already provided as part of the semiconductor storage device. In the case where such circuitry is to be incorporated in the semiconductor storage device, the state machine or microprocessor for handling a data processing program or an erase algorithm may be utilized so as to also serve as such circuitry. The content to be written in response to the security release key setting instruction may be an externally input value, or any value obtained by subjecting an externally input value to the unidirectional hash conversion circuit shown in FIG. 2, for example, may be used. In the latter case, if one somehow (through the use of unauthorized means) manages to directly read a security registration lock or security release key that is written in the memory, the value cannot be merely copied and directly written to the memory. A security registration lock setting instruction can also be realized by using the same construction as that for the security release key setting instruction.

Figure 2:
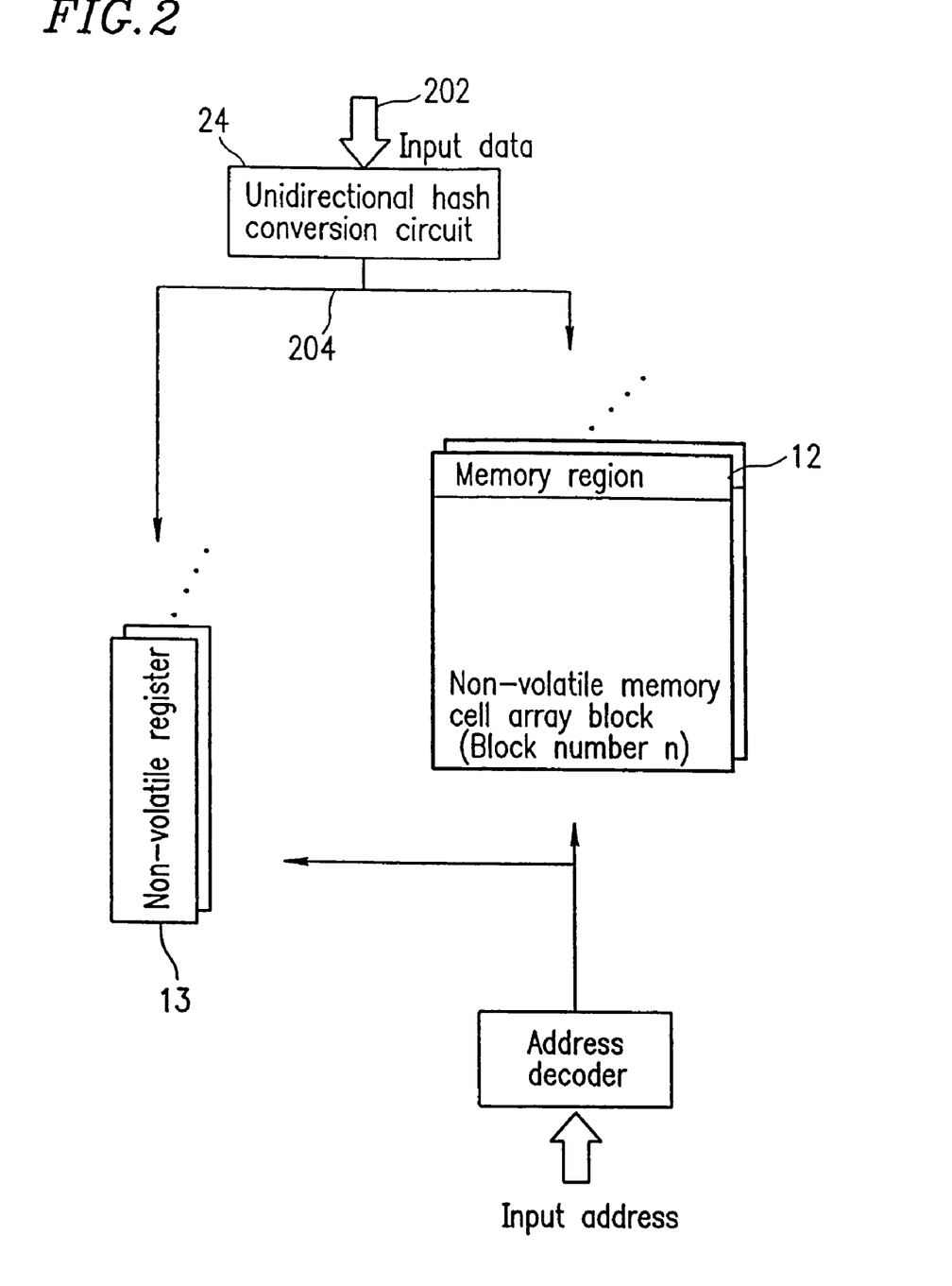
FIG. 2 is a block diagram illustrating an embodiment of the non-volatile semiconductor storage device 100 according to the present invention, in which a unidirectional hash conversion circuit 24 is incorporated.

In order to further enhance the security level, means may be incorporated to prevent the security release keys and the security registration locks from being easily read. For example, as shown in FIG. 2, when writing the security registration locks and security release keys to the non-volatile registers 13 and the memory regions 12, respectively, converted values 204 obtained by applying a unidirectional hash function to input data 202 in the unidirectional hash conversion circuit 24 may be written instead.

As a result, even if an unauthorized party somehow manages to read the converted values 204 which are stored in the non-volatile semiconductor storage device as the security release keys and security registration locks, it is difficult for the unauthorized party to know the security release keys before conversion, thereby making it difficult to obtain a grant for reading the data which has been subjected to unauthorized rewriting. The input data 202 may be supplied via a similar path (e.g., a data bus) to the ordinary data input/output path to the respective blocks.

Furthermore, the means for allowing values of the security release keys and security registration locks to be read to the exterior of the non-volatile semiconductor storage device may simply be omitted so as to prevent leakage of the security registration locks and security release keys to unauthorized parties. As for the security registration locks, this can be realized by merely providing means for performing a write operation to the non-volatile registers 13 while omitting means for reading.

Although the security release keys are placed in the memory region 12 within each block, the memory regions 12 are separate from the address space which regularly receives external designation by a user (system). Therefore, it is possible to ensure that the security release keys cannot be directly read to the exterior of the semiconductor storage device. For example: (1) the data bus 107 for the memory region 12 may not be coupled to the data bus 103 (through which data can be externally output); or (2) the output switching circuit 16 or any other portion (output multiplexer, output buffer, etc.) may be controlled so as to prohibit outputting during access to the security release keys (i.e., while the extension row decoder 18a is selected).

By prohibiting rewriting of the security registration locks, it is possible to prevent the rewriting of the security registration locks by an unauthorized party. For example, a lock flag may be stored in a lock flag storing region (bit) provided in each non-volatile register 13 for storing a security registration lock, the lock flag being set when a security registration lock setting instruction is executed. Thus, it may be ensured that the security registration lock setting instruction will not be executed for any block for which a lock flag is set.

The lock flag may be disengaged later. However, a higher level of security can be provided if the lock flag is not releasable. Alternatively, the security registration locks may be set in a one-time programmable ROM (OTP-ROM).

Furthermore, in order to prevent the security function from being released as a result of repetitive attacks attempted on the security release keys, a flag indicating that a security release key has been set may be automatically or manually set in the memory region 12 when the security release key is written. As a result, any subsequent writing to that memory cell array block can be prohibited.

Since any subsequent writing to that memory cell array block is prohibited, an unauthorized party who wishes to break the security without knowing the value of the security registration lock may attempt a series of steps as follows. First, the memory cell array block which the unauthorized party wishes to tamper with may be erased. Next, after writing false data to the block, the unauthorized party may repetitively try to read the falsely written data with any arbitrarily-selected security release key which appears promising to the unauthorized party, until the security function is successfully released. However, it should be pointed out that such repetitive attacks would not be practical from the following perspective. First, non-volatile semiconductor storage devices, such as flash memories, can only withstand a certain number of rewrites. Thus, repetitive attacks may themselves cause unwanted deterioration in the semiconductor storage device, leading to a reduced device life. Another reason why repetitive attacks would not be practical is that repetitive attacks, each round of which involves concurrent erasure for a block, writing to the block, and setting a security release key, are time-consuming in the case of flash memories and the like, where a relatively long time will be required for block erasure and data write to blocks.

Furthermore, by providing circuitry which automatically requests a wait operation during the writing of security release keys to the memory regions 12, it can be ensured that an even longer time will be required for write operations. As a result, each round of repetitive attacks which are attempted on the security release keys by an unauthorized party will take longer, making it difficult to locate the right security release key in a reasonable amount of time.

A wait operation can be realized by, for example, including a wait routine (of codes) in the operation of the state machine or microprocessor for handling a security release key setting instruction wait circuit according to the present invention. As an example of a state-machine implementation of a wait circuit, a counter circuit which operates with an internal clock signal may be employed so that a wait time is observed until the counter reaches a predetermined value. In the case of flash memories, such a wait operation can be realized by utilizing a circuit or a microprocessor routine for applying a profile or an erase voltage to memory cells for a predetermined period of time.

Furthermore, the semiconductor storage device according to the present invention can be used in the manner of an ordinary non-volatile semiconductor storage device not having a security function, except in the case of performing a rewrite to blocks which are protected against unauthorized rewriting. Therefore, the semiconductor storage device according to the present invention can be incorporated in any existing system to easily impart the system with a security function. Thus, according to the present invention, in applications such as BIOS or firmware, which functions as a RAM at the time of up-grading a system (including "bug fix"), rewriting by unauthorized (or general) users can be prevented.

In the case of a system which does not require rewriting of any stored content once a semiconductor storage device is installed in a system, the semiconductor storage device according to the present invention can be simply incorporated in the system to impart the system with a security function. A rewrite operation to any block which is protected against unauthorized rewriting may be handled by the system incorporating the semiconductor storage device. Alternatively, such a rewrite operation may be handled by an external rewriter (e.g., a ROM writer) which is coupled to the system at the time of rewriting the stored contents. Furthermore, an external rewriter which includes a rewrite instruction program routine intended for non-volatile semiconductor storage devices can be directly incorporated in any existing system, whereby a security function can be easily imparted to the system.

The present invention is applicable to any flash memories and LSIs incorporating flash memories for storing software, e.g., BIOS or firmware.

In such applications, it is often the case that means for performing a rewrite operation is provided in the system to facilitate up-grading of software (including bug fix). The reason behind this is the increased difficulty to replace non-volatile semiconductor storage devices containing software due to reduced device size, and also the increased need for rewriting software due to shorter development cycles and shorter lives of software. There is also a desire to prevent users from attempting unauthorized software tampering.

In accordance with the non-volatile semiconductor storage device according to the present invention, if a rewrite operation to a block which is protected against unauthorized tampering is attempted on the system by a user who does not know the security release key, then it becomes impossible for the system to read the software codes or data in the block which has received tampering, that is, the entire system becomes non-functional. Yet, a user or system manufacturer who does know the security release key can revive the block which has been tampered with by setting a security release key after the data rewrite. When security release keys and security registration locks have not been set in the non-volatile semiconductor storage device according to the present invention, it is possible to freely write data to or read data from the semiconductor storage device.

As described above, according to the present invention, there is provided a function of preventing unauthorized rewriting by unauthorized parties while permitting rewriting of software and data on the system by an authorized user who knows the security release key.

In a regular mode of use which does not involve data rewriting, security release keys are not exchanged with any external system. Therefore, it is unnecessary to retain the security release keys in the system incorporating the non-volatile semiconductor storage device according to the present invention. As a result, there is no way, authorized or unauthorized, of knowing the security release keys off of the system incorporating the non-volatile semiconductor storage device according to the present invention, so that a very safe security function can be provided.

Since security release keys are not exchanged with any external system in a regular mode of use according to the present invention, it is possible to provide a security function while maintaining compatibility with conventional non-volatile semiconductor storage devices. In a regular mode of use, it is unnecessary to provide any special software in the system to allow the use of the non-volatile semiconductor storage device according to the present invention. In the case where the non-volatile semiconductor storage device according to the present invention is constructed so that an authentication operation is activated in response to an instruction from a user (or from the system), some simple software means will be required on the system to enable issuance of such an instruction; however there is no need for any additional hardware.

The semiconductor storage device according to the present invention renders any repetitive attacks attempted by unauthorized tamperers impractical to know the security release keys in an unauthorized manner. Thus, a formidable security function can be provided.

The security function for preventing unauthorized rewriting according to the present invention can be realized by using circuitry of a reduced size and complexity than conventional circuitry for realizing a security function.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A semiconductor storage device having a security function for imposing limitation on data rewriting, the semiconductor storage device comprising:
    at least one non-volatile memory cell array block which is capable of receiving concurrent electrical erasure, the at least one non-volatile memory cell array block comprising at least one main memory block region to store data, and
    at least one memory region configured to store a security release key corresponding to each of the at least one memory cell array block;
    at least one nonvolatile storage unit configured to store a security registration lock corresponding to each of the at least one memory cell array block;
    a determination circuit for comparing a value which is generated based on the security release key against a value which is generated based on the security registration lock to determine whether or not to grant release of the security function; and
    a memory cell array data output switching circuit for, when an output signal from the determination circuit indicates a matching result of comparison between the value which is generated based on the security release key and the value which is generated based on the security registration lock, permitting data which is read from a corresponding one of the at least one memory cell array block to be externally output.

2. A semiconductor storage device according to claim 1, wherein:
    the semiconductor storage device further comprises at least one register for retaining an output signal output from the determination circuit; and
    when an output signal output from the at least one register indicates that release of the security function is to be granted, the memory cell array data output switching circuit permits data which is read from a corresponding one of the at least one memory cell array block to be externally output.

3. A semiconductor storage device according to claim 2, wherein the determination circuit compares the value which is generated based on the security release key against the value which is generated based on the security registration lock for each of the at least one memory cell array block, and results of comparison are collaterally written in the at least one register.

4. A semiconductor storage device according to claim 1, further comprising instruction interpretation means for interpreting an externally-input setting instruction to write at least one of the security release key and the security registration lock into the at least one memory region or the at least one non-volatile storage means, respectively.

5. A semiconductor storage device according to claim 1, further comprising a unidirectional conversion circuit or an encryption circuit, wherein results of converting the security release key and the security registration lock by means of the unidirectional conversion circuit or the encryption circuit are written to the at least one memory region and the at least one non-volatile storage means, respectively.

6. A semiconductor storage device according to claim 1, which lacks means for reading the security release key and the security registration lock.

7. A semiconductor storage device according to claim 1, wherein:
    the at least one non-volatile storage means is a one-time programmable Read Only Memory which prohibits rewriting and erasure; and
    rewriting and erasure are prohibited after the security registration lock is written.

8. A semiconductor storage device according to claim 1, wherein:
    the at least one non-volatile storage means is a one-time programmable Read Only Memory which prohibits rewriting and erasure; and
    the semiconductor storage device has a non-volatile lock function for locking the semiconductor storage device to prohibit rewriting and erasure after writing of the security registration lock has been performed.

9. A semiconductor storage device according to claim 1, further comprising a flag indicating that the security release key has been set,
    wherein the flag is set automatically or manually after the security release key is written, thereby prohibiting additional writing to the corresponding one of the at least one memory cell array block.

10. A semiconductor storage device according to claim 1, wherein a wait operation is performed while writing the security release key to the at least one memory region.

11. A semiconductor storage device according to claim 1, wherein the at least one memory region is further configured to be erased when the at least one non-volatile memory cell array block receives concurrent electrical erasure.

* * * * *